(12) United States Patent
Wakabayashi

(10) Patent No.: US 11,312,029 B2
(45) Date of Patent: Apr. 26, 2022

(54) THREE-DIMENSIONAL MEASURING APPARATUS, ROBOT, AND ROBOT SYSTEM

(71) Applicant: Seiko Epson Corporation, Tokyo (JP)

(72) Inventor: Shuichi Wakabayashi, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 327 days.

(21) Appl. No.: 16/556,261

(22) Filed: Aug. 30, 2019

(65) Prior Publication Data
US 2020/0070370 A1 Mar. 5, 2020

(30) Foreign Application Priority Data

Sep. 3, 2018 (JP) .............................. JP2018-164241

(51) Int. Cl.
| | | |
|---|---|---|
| *G05B 15/00* | (2006.01) | |
| *G05B 19/00* | (2006.01) | |
| *B25J 19/02* | (2006.01) | |
| *B25J 9/16* | (2006.01) | |
| *B25J 13/08* | (2006.01) | |
| *G06T 7/521* | (2017.01) | |

(52) U.S. Cl.
CPC ............. *B25J 19/022* (2013.01); *B25J 9/163* (2013.01); *B25J 9/1697* (2013.01); *B25J 13/08* (2013.01); *B25J 19/023* (2013.01); *G06T 7/521* (2017.01)

(58) Field of Classification Search
CPC ........... G05B 2219/40053; G05B 2219/40533; G05B 2219/40564; G06T 7/521; G06T 2207/10016; G06T 2207/10152; G06T 2207/30164; B25J 13/08; B25J 19/022; B25J 19/023; B25J 9/163; B25J 9/1697
See application file for complete search history.

(56) References Cited

U.S. PATENT DOCUMENTS 6,496,225 B1 * 12/2002 Higashihara ..... H04N 5/232122
348/345
2010/0312393 A1 12/2010 Someya

FOREIGN PATENT DOCUMENTS

| JP | 2011-011330 A | | 1/2011 | |
|---|---|---|---|---|
| JP | 2017075887 A | * | 4/2017 | |
| WO | WO-2019186984 A1 | * | 10/2019 | ............... G06T 7/73 |

* cited by examiner

*Primary Examiner* — Harry Y Oh
(74) *Attorney, Agent, or Firm* — Gang Yu

(57) ABSTRACT

A three-dimensional measuring apparatus includes a projection unit that projects a first pattern light and a second pattern light by a laser beam on a region containing an object, an imaging unit that images a captured image of the region, a vibration information receiving part that receives vibration information on a vibration of the projection unit or the imaging unit, and a measuring unit that measures a three-dimensional shape of the object based on the captured image, wherein the region on which the first pattern light having a first period is projected is imaged by the imaging unit when the vibration information is equal to or smaller than a first threshold value.

15 Claims, 12 Drawing Sheets

THREE-DIMENSIONAL MEASURING APPARATUS, ROBOT, AND ROBOT SYSTEM

The present application is based on, and claims priority from, JP Application Serial Number 2018-164241, filed Sep. 3, 2018, the disclosure of which is hereby incorporated by reference herein in its entirety.

BACKGROUND

1. Technical Field

The present disclosure relates to a three-dimensional measuring apparatus, robot, and robot system.

2. Related Art

A robot with camera disclosed in JP-A-2011-11330 is configured to release the shutter of a camera when the position of the camera is equal to or less than a preset position threshold value and the movement speed of the camera is equal to or less than a preset speed threshold value. According to the configuration, blur of images due to searching for works may be prevented, position errors may be reduced, and work efficiency may be improved by quick releases of the shutter.

However, in the case where a phase shift method for a three-dimensional measurement of a work by a plurality of times of imaging is used, even when the shutter speed is made faster at times with less camera shakes, there is a problem of reduction of measurement accuracy when imaging is performed at a time when vibration having amplitude in magnitude beyond the measurement accuracy is left in the camera.

SUMMARY

A three-dimensional measuring apparatus according to an aspect of the present disclosure is a three-dimensional measuring apparatus that performs a three-dimensional measurement of an object using a laser beam, including a projection unit that projects a first pattern light and a second pattern light by the laser beam on a region containing the object, an imaging unit that images a captured image of the region, a vibration information receiving part that receives vibration information on a vibration of the projection unit or the imaging unit, and a measuring unit that measures a three-dimensional shape of the object based on the captured image, wherein the region on which the first pattern light having a first period is projected is imaged by the imaging unit when the vibration information is equal to or smaller than a first threshold value, and the region on which the second pattern light having a second period shorter than the first period is projected is imaged by the imaging unit when the vibration information is equal to or smaller than a second threshold value smaller than the first threshold value.

DESCRIPTION OF EXEMPLARY EMBODIMENTS

As below, a three-dimensional measuring apparatus, robot, and robot system according to the present disclosure will be explained in detail based on embodiments shown in the accompanying drawings.

First Embodiment

Figure 1:
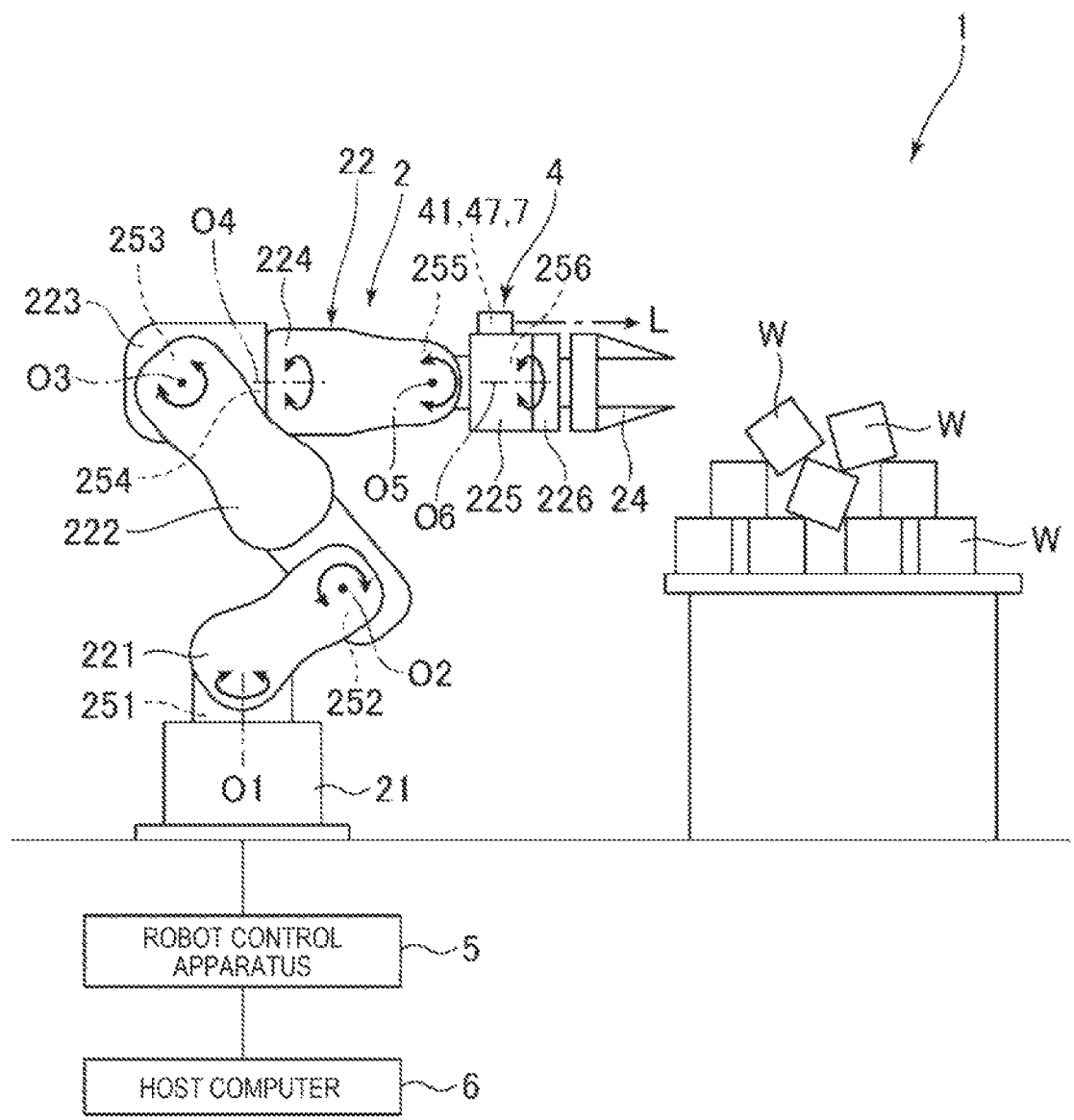
FIG. 1 shows an overall configuration of a robot system according to a first embodiment of the present disclosure.
Figure 2:
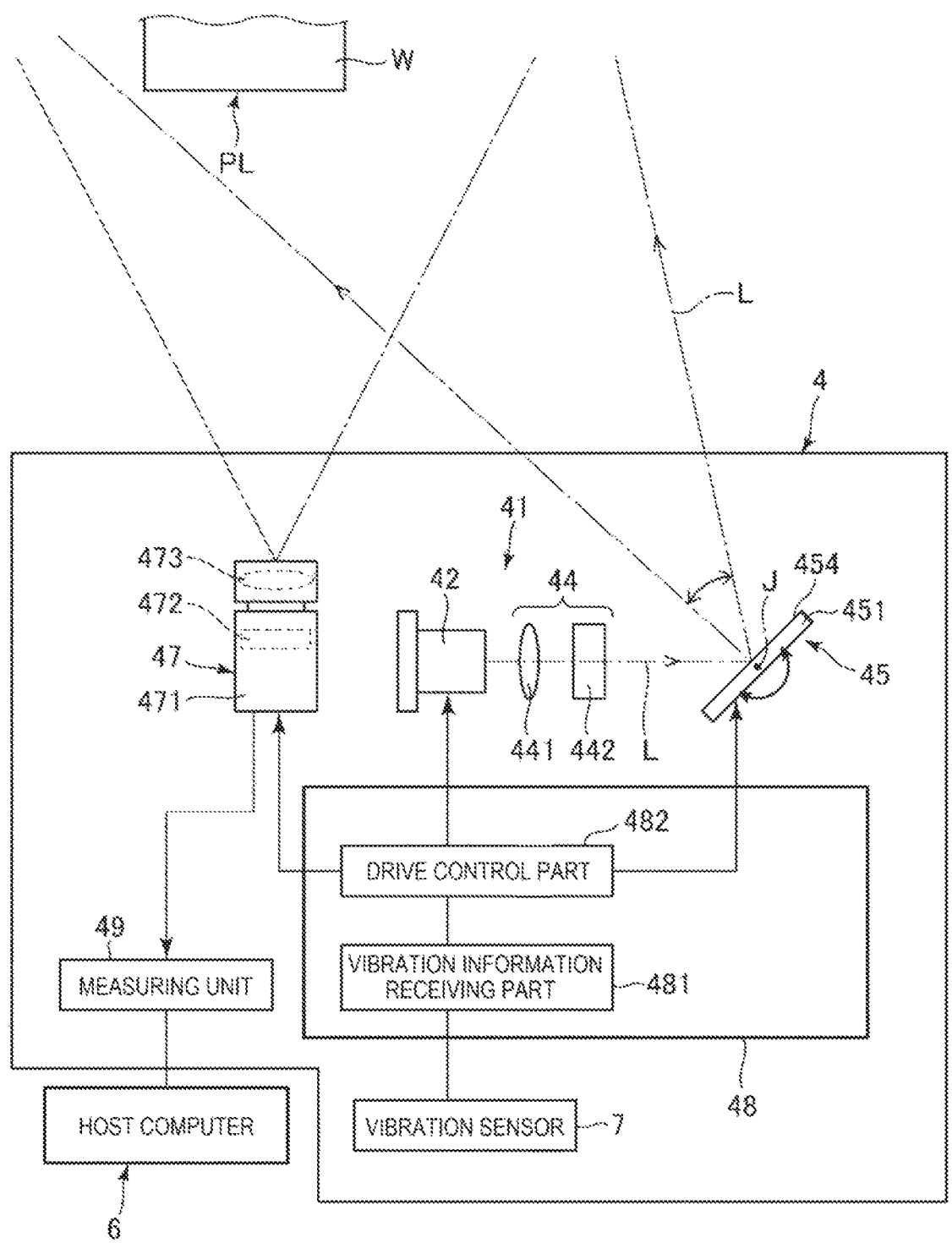
FIG. 2 shows an overall configuration of a three-dimensional measuring apparatus.
Figure 3:
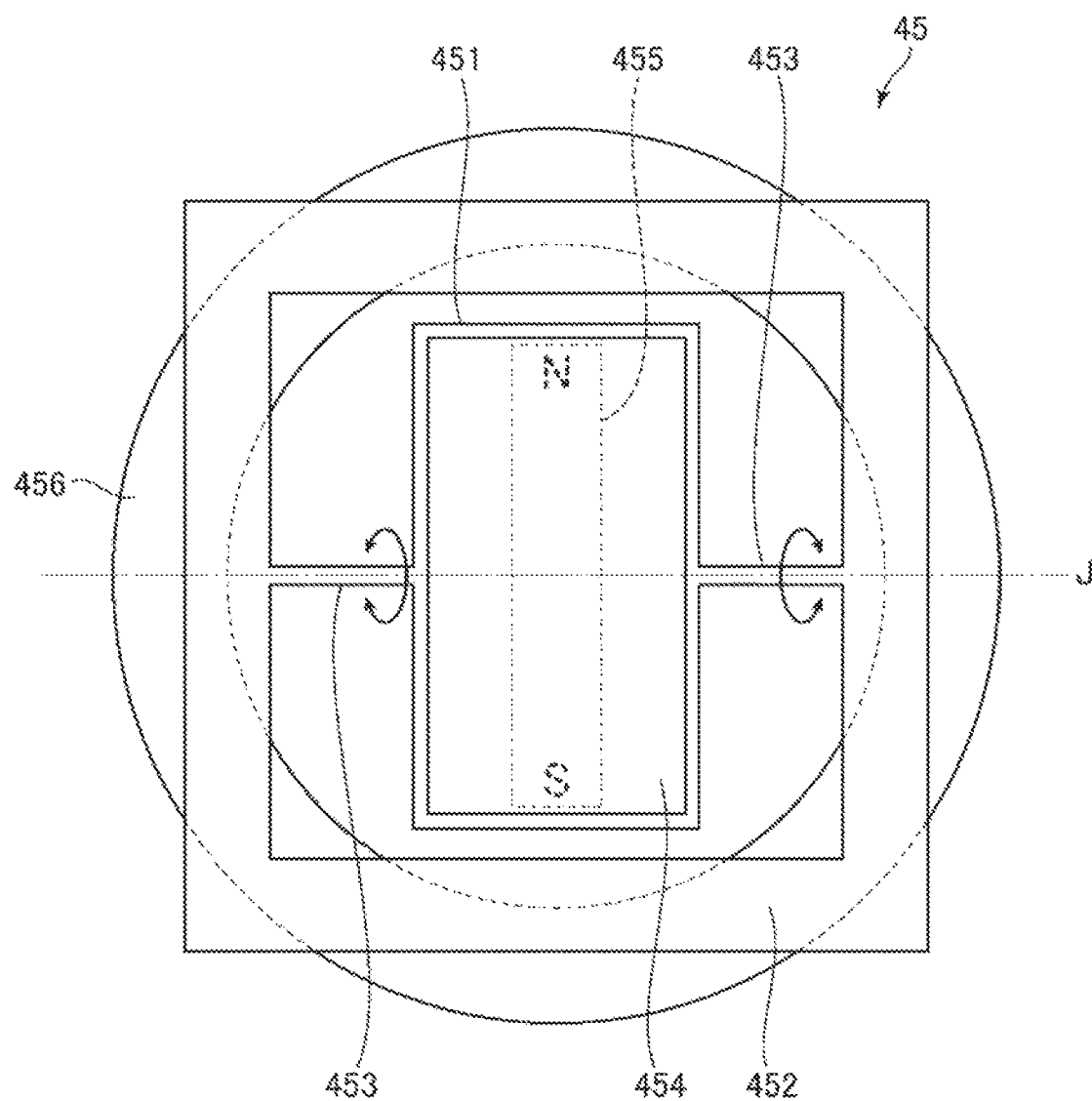
FIG. 3 is a plan view showing an optical scanning part of the three-dimensional measuring apparatus shown in FIG. 2.
Figure 4:
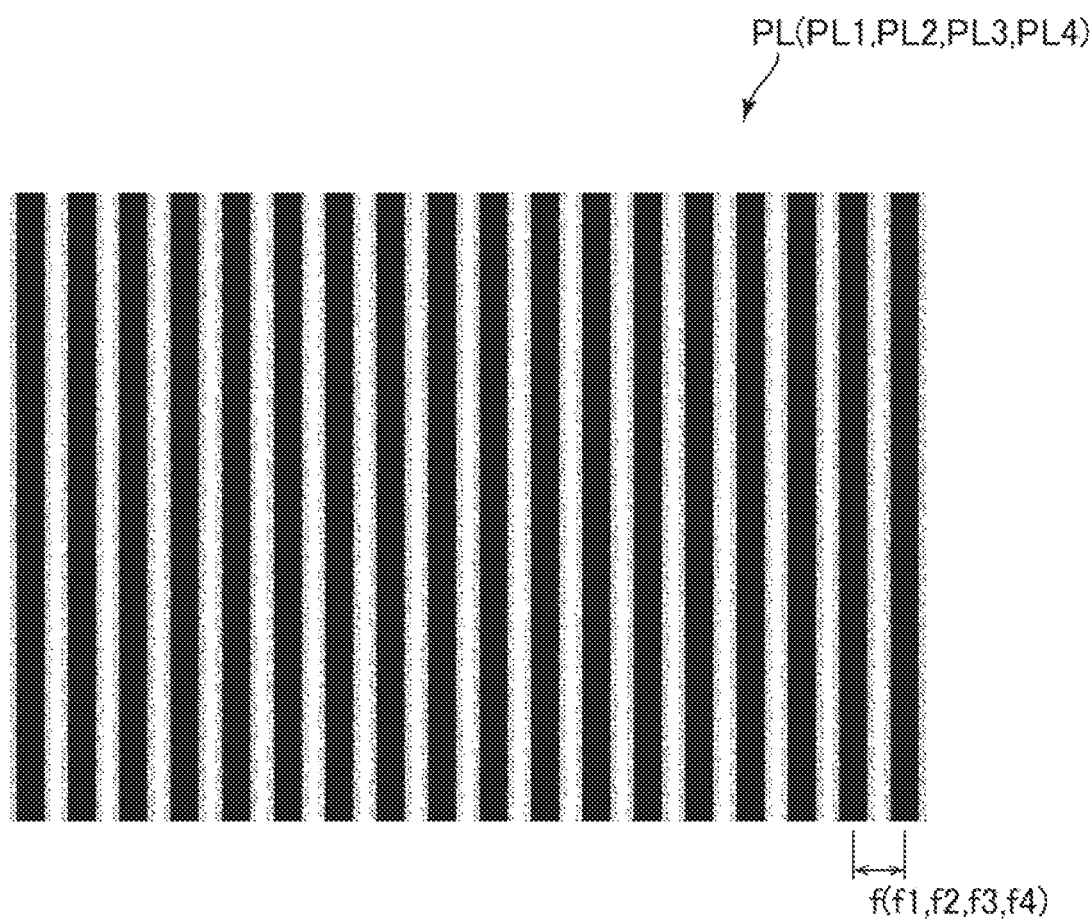
FIG. 4 is a plan view showing an example of a pattern light projected by a projection unit.
Figure 5:
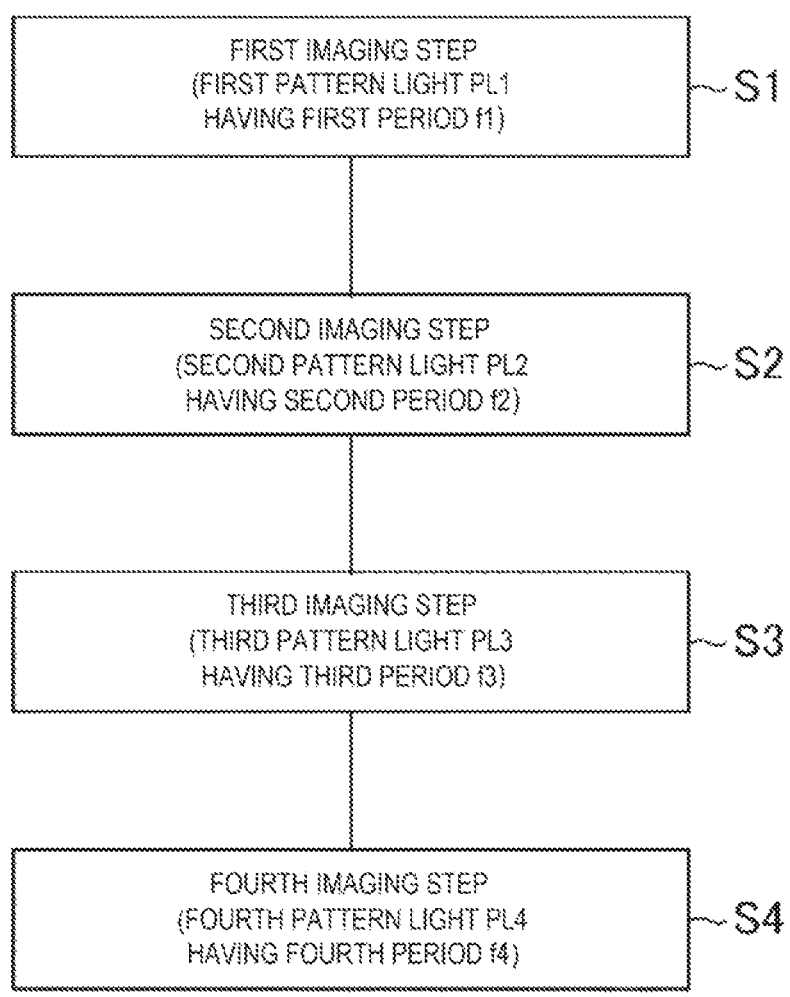
FIG. 5 is a flowchart showing a procedure of a three-dimensional measurement using a phase shift method.
Figure 6:
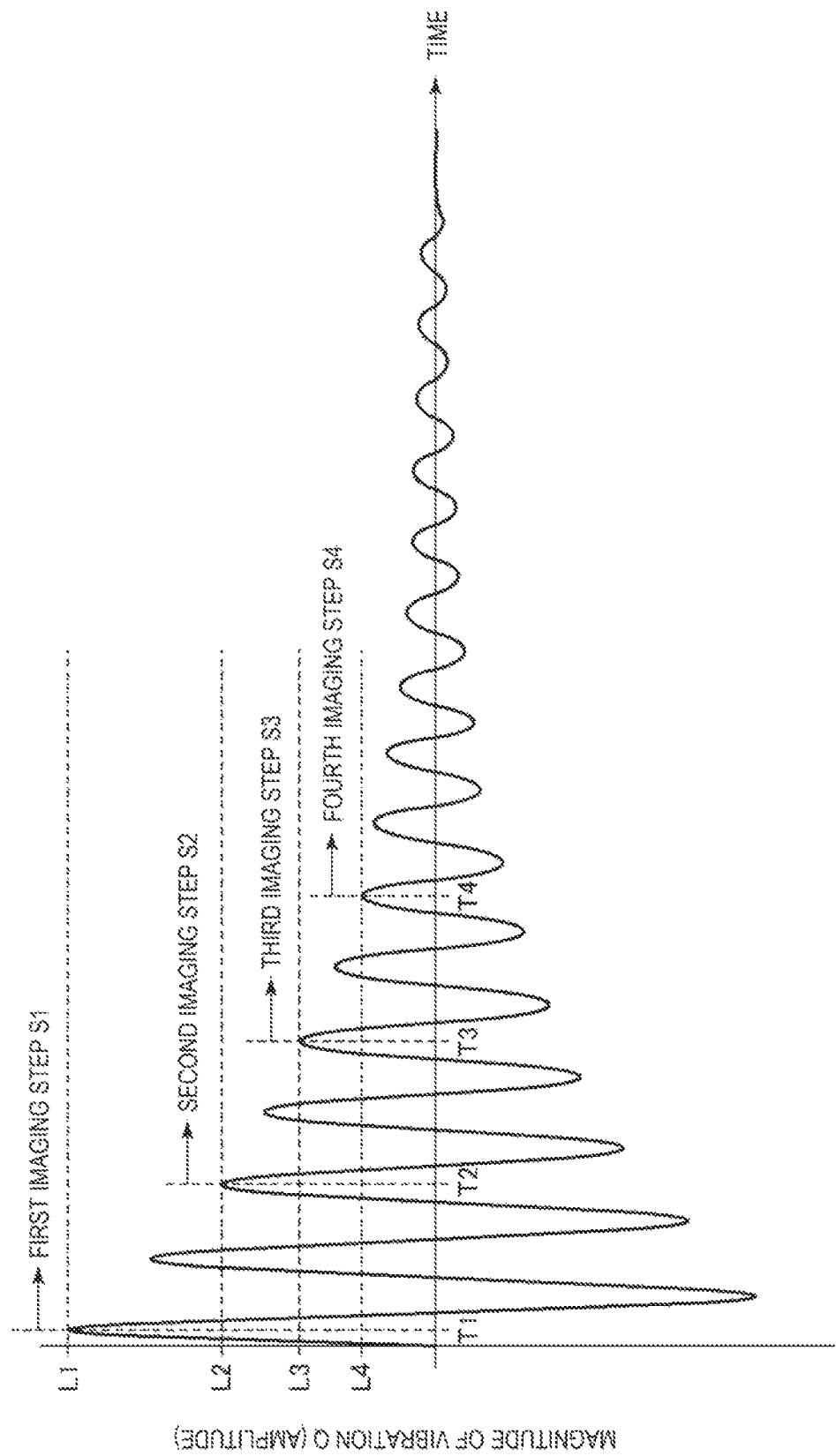
FIG. 6 is a graph showing relationships between magnitude of vibration and start times of first to fourth imaging steps.

FIG. 1 shows the overall configuration of the robot system according to the first embodiment of the present disclosure. FIG. 2 shows the overall configuration of the three-dimensional measuring apparatus. FIG. 3 is the plan view showing the optical scanning part of the three-dimensional measuring apparatus shown in FIG. 2. FIG. 4 is the plan view showing the example of the pattern light projected by the projection unit. FIG. 5 is the flowchart showing the procedure of the three-dimensional measurement using the phase shift method. FIG. 6 is the graph showing the relationships between the magnitude of vibration and the start times of the first to fourth imaging steps.

The robot system 1 shown in FIG. 1 has a robot 2, a three-dimensional measuring apparatus 4 that performs a three-dimensional measurement of an object W using a laser beam L, a vibration sensor 7 that detects vibration Q of the three-dimensional measuring apparatus 4, a robot control apparatus 5 that controls driving of the robot 2 based on a measurement result of the three-dimensional measuring apparatus 4, and a host computer 6 that can communicate with the robot control apparatus 5. These respective parts can communicate via wired or wireless connection and the communication may be made via a network such as the Internet.

Robot

The robot 2 is a robot that performs work including e.g. feeding, removing, carrying, and assembly of precision apparatuses and components forming the apparatuses. Note that the usage of the robot 2 is not particularly limited. The robot 2 of the embodiment is a six-axis robot and, as shown in FIG. 1, has a base 21 fixed to a floor or ceiling and a robot arm 22 coupled to the base 21.

The robot arm 22 has a first arm 221 coupled to the base 21 pivotably about a first axis O1, a second arm 222 coupled to the first arm 221 pivotably about a second axis O2, a third arm 223 coupled to the second arm 222 pivotably about a third axis O3, a fourth arm 224 coupled to the third arm 223 pivotably about a fourth axis O4, a fifth arm 225 coupled to the fourth arm 224 pivotably about a fifth axis O5, and a sixth arm 226 coupled to the fifth arm 225 pivotably about a sixth axis O6. Further, an end effector 24 according to the work to be executed by the robot 2 is attached to the sixth arm 226.

The robot 2 further has a first drive device 251 that pivots the first arm 221 relative to the base 21, a second drive device 252 that pivots the second arm 222 relative to the first arm 221, a third drive device 253 that pivots the third arm 223 relative to the second arm 222, a fourth drive device 254 that pivots the fourth arm 224 relative to the third arm 223, a fifth drive device 255 that pivots the fifth arm 225 relative to the fourth arm 224, and a sixth drive device 256 that pivots the sixth arm 226 relative to the fifth arm 225. The first to sixth drive devices 251 to 256 respectively have e.g. motors as drive sources, controllers that control driving of the motors, and encoders that detect amounts of rotation of the motors. The first to sixth drive devices 251 to 256 are respectively independently controlled by the robot control apparatus 5.

Note that the robot 2 is not limited to the configuration of the embodiment. For example, the number of arms of the robot arm 22 may be one to five, seven, or more. Further, for example, the type of the robot 2 may be a scalar robot or a dual-arm robot having two robot arms 22.

Robot Control Apparatus

The robot control apparatus 5 receives a position command of the robot 2 from the host computer 6, and controls driving of the first to sixth drive devices 251 to 256 respectively independently so that the respective arms 221 to 226 may be in positions according to the received position command. The robot control apparatus 5 includes e.g. a computer and has a processor (CPU) that processes information, a memory that can be communicably connected to the processor, and an external interface. Various programs executable by the processor are stored in the memory, and the processor may read and execute the various programs stored in the memory or the like.

Vibration Sensor

The vibration sensor 7 is provided in the robot 2 and detects vibration of the three-dimensional measuring apparatus 4, particularly, a projection unit 41 or imaging unit 47, which will be described later. In the embodiment, the vibration sensor 7 is provided inside of the three-dimensional measuring apparatus 4 at the fifth arm 225, and thereby, may detect the vibration of the three-dimensional measuring apparatus 4 with higher accuracy. The vibration sensor 7 is not particularly limited as long as the sensor may detect vibration, but e.g. an angular velocity sensor, an acceleration sensor, or the like may be used.

Note that the placement of the vibration sensor 7 is not particularly limited as long as the sensor may detect the vibration of the three-dimensional measuring apparatus 4, particularly, the projection unit 41 or imaging unit 47. For example, the sensor may be placed at the fifth arm 225 separately from the three-dimensional measuring apparatus 4, placed in another arm than the fifth arm 225, i.e., an arm different from the arm at which the three-dimensional measuring apparatus 4 is placed, or placed at another part than the robot 2 e.g. a ceiling, floor, wall, or the like. When the vibration sensor 7 is placed at another part than the robot 2, the vibration sensor 7 may use e.g. a laser vibration sensor that outputs the laser beam L toward the fifth arm 225, receives a reflected light thereof, and thereby, detects the vibration of the fifth arm 225.

Three-Dimensional Measuring Apparatus

The three-dimensional measuring apparatus 4 performs a three-dimensional measurement of the object W using a phase shift method. As shown in FIG. 2, the three-dimensional measuring apparatus 4 includes the projection unit 41 that projects a pattern light PL by the laser beam L on a region containing the object W, the imaging unit 47 that acquires a captured image by imaging the region containing the object W on which the pattern light PL is projected, a control unit 48 having a vibration information receiving part 481 that receives vibration information on the vibration of the three-dimensional measuring apparatus from the vibration sensor 7 and controlling driving of the projection unit 41 and the imaging unit 47 based on the vibration information received by the vibration information receiving part 481, and a measuring unit 49 that measures a three-dimensional shape of the object W based on the captured image.

Of these respective component elements, at least the projection unit 41 and the imaging unit 47 are respectively fixed to the fifth arm 225 of the robot 2. Accordingly, the relative position relationship between the projection unit 41 and the imaging unit 47 is fixed. Further, the projection unit 41 is placed to radiate the laser beam L toward the distal end side of the fifth arm 225, i.e., the end effector 24 side, and the imaging unit 47 is placed to face the distal end side of the fifth arm 225 to image a region containing the radiation range of the laser beam L.

Here, the relationship in which the end effector 24 is located at the distal end side of the fifth arm 225 is maintained even when the other arms 221 to 224, 226 than the fifth arm 225 move. Accordingly, the projection unit 41 and the imaging unit 47 are fixed to the fifth arm 225, and thereby, the three-dimensional measuring apparatus 4 may constantly output the laser beam L toward the distal end side of the end effector 24 and image the distal end side of the end effector 24. Therefore, regardless of the posture when the end effector 24 is to grip the object W, i.e., the posture of the end effector 24 relative to the object W, the end effector may radiate the laser beam L toward the object W in the posture and image the object W. Accordingly, the three-dimensional measurement of the object W may be performed more reliably.

Note that the placement of the projection unit 41 and the imaging unit 47 is not particularly limited, but the units may be fixed to the first to fourth arms 221 to 224 or sixth arm 226. Or, the projection unit 41 and the imaging unit 47 may be fixed to the different arms from each other and respectively include the vibration sensors 7. Or, one of the projection unit 41 and the imaging unit 47 may be fixed to an immovable part such as the base 21, a floor, ceiling, or wall. In this case, one of the projection unit 41 and the imaging unit 47 fixed to the arm as a movable part may include the vibration sensor 7.

The projection unit 41 has a function of radiating the laser beam L toward the object W, and thereby, projecting the predetermined pattern light PL as shown in FIG. 4 on the object W. As shown in FIG. 2, the projection unit 41 has a laser source 42 that outputs the laser beam L, an optical system 44 including a plurality of lenses through which the laser beam L pass, and an optical scanning part 45 that scans with the laser beam L passing through the optical system 44 toward the object W. The laser source is not particularly limited, but e.g. a semiconductor laser such as a vertical cavity surface emitting laser (VCSEL) or vertical external cavity surface emitting laser (VECSEL) may be used.

The optical system 44 has a collecting lens 441 that collects the laser beam L output from the laser source 42 to the vicinity of the object W, and a rod lens 442 that forms the laser beam L collected by the collecting lens 441 in a linear shape extending in a direction parallel to a pivot axis J, which will be described later (a depth direction on the paper surface of FIG. 2).

The optical scanning part 45 has a function of scanning with the laser beam L linearized by the rod lens 442. Thereby, the laser beam L may be two-dimensionally (planarly) diffused and radiated. As described above, the laser beam L is two-dimensionally diffused, and thereby, as the optical path of the laser beam L is longer, the output per unit area is lower. The optical scanning part 45 is not particularly limited, but e.g. MEMS (Micro Electro Mechanical Systems), galvano mirror, polygon mirror, or the like may be used.

The optical scanning part 45 of the embodiment includes MEMS. As shown in FIG. 3, the optical scanning part 45 has a movable portion 451, a supporting portion 452 supporting the movable portion 451, a beam portion 453 coupling the movable portion 451 and the supporting portion 452 to make the movable portion 451 pivotable about the pivot axis J relative to the supporting portion 452, a mirror 454 placed on a front surface (a surface on the near side of the paper surface of FIG. 3) of the movable portion 451 and reflecting the laser beam L, a permanent magnet 455 provided on a back surface (a surface on the far side of the paper surface of FIG. 3) of the movable portion 451, and a coil 456 placed to face the permanent magnet 455.

The optical scanning part 45 is placed so that the pivot axis J may be substantially aligned with the extension direction of the linear laser beam L. When a drive signal is applied to the coil 456, the movable portion 451 repeats forward pivot and backward pivot in a predetermined cycle about the pivot axis J, and thereby, planar scanning is performed using the linear laser beam L.

As above, the projection unit 41 is explained, however, the configuration thereof is not particularly limited as long as the unit may project the predetermined pattern light PL on the object W. For example, in the embodiment, the laser beam L is linearly diffused by the optical system 44, however, for example, may be linearly diffused by the MEMS or galvano mirror. That is, two-dimensional scanning with the laser beam L may be performed using two optical scanning parts 45. Or, for example, two-dimensional scanning with the laser beam L may be performed using gimbal MEMS having a degree of freedom of two axes.

The imaging unit 47 images a state in which the pattern light PL is projected on at least one object W. That is, the imaging unit 47 images at least one object W containing the pattern light PL. As shown in FIG. 2, the imaging unit 47 includes a camera 471 having e.g. an imaging device 472 such as a CMOS image sensor or CCD image sensor and a collecting lens 473. The camera 471 is coupled to the measuring unit 49 and transmits image data to the measuring unit 49.

As shown in FIG. 2, the control unit 48 has a vibration information receiving part 481 that receives vibration information on the vibration of the three-dimensional measuring apparatus 4 from the vibration sensor 7, and a drive control part 482 that controls driving of the projection unit 41 and the imaging unit 47 based on the vibration information received by the vibration information receiving part 481. The control unit 48 includes e.g. a computer and has a processor (CPU) that processes information, a memory that can be communicably connected to the processor, and an external interface. Various programs executable by the processor are stored in the memory, and the processor may read and execute the various programs stored in the memory or the like.

Here, as described above, the vibration sensor 7 is placed in the same fifth arm 225 as the projection unit and the imaging unit 47, and particularly, in the embodiment, provided inside of the three-dimensional measuring apparatus 4. Accordingly, the vibrations of the projection unit 41 and the imaging unit 47 may be detected with higher accuracy by the vibration sensor 7. Note that it is only necessary that the vibration sensor 7 may detect the vibration of at least one of the projection unit 41 and the imaging unit 47 and the vibration information receiving part 481 may receive vibration information on the vibration of at least one of the projection unit 41 and the imaging unit 47. When the projection unit 41 and the imaging unit 47 are located in different positions and vibrations acting on the units are different, the respectively independent vibration sensors 7 may be provided in the units and the vibration information of the greater vibration from the vibration sensors 7 may be used. Note that the vibration information is not limited to, but includes magnitude of the vibration Q, i.e., a peak value (local maximum value) of the amplitude, a value obtained by time average of the absolute value of the amplitude, or the like.

The drive control part 482 applies a drive signal to the coil 456 to control driving of the optical scanning part 45, and applies a drive signal to the laser source 42 to control driving of the laser source 42. The drive control part 482 outputs the laser beam L from the laser source 42 in synchronization with the pivot of the movable portion 451, and projects e.g. a pattern light PL having a repetition period (period f) of a stripe pattern represented by light and dark of brightness values as shown in FIG. 4 on the object W. Note that the pattern light PL is not particularly limited as long as the light may be used for the phase shift method, which will be described later. Further, the drive control part 482 controls driving of the camera 471 and images a region containing the object W at a predetermined time.

Next, drive control of the projection unit 41 and the imaging unit 47 by the drive control part 482, specifically, the phase shift method executed by the drive control part 482 will be explained in detail. As shown in FIG. 5, the drive control part 482 has a first imaging step S1 of projecting a first pattern light PL1 having a first period f1 on the object W using the projection unit 41 and imaging a region containing the object W on which the first pattern light PL1 is projected using the camera 471. The drive control part 482 has a second imaging step S2 of projecting a second pattern light PL2 having a second period f2 shorter than the first period f1 on the object W using the projection unit 41 and imaging a region containing the object W on which the second pattern light PL2 is projected using the camera 471. The drive control part 482 has a third imaging step S3 of projecting a third pattern light PL3 having a third period f3 shorter than the second period f2 on the object W using the projection unit 41 and imaging a region containing the object W on which the third pattern light PL3 is projected using the camera 471. The drive control part 482 has a fourth imaging step S4 of projecting a fourth pattern light PL4 having a fourth period f4 shorter than the third period f3 on the object W using the projection unit 41 and imaging a region containing the object W on which the fourth pattern light PL4 is projected using the camera 471. Note that, as shown in FIG. 4, the period f of the pattern light PL refers to the repetition period (wavelength) of the stripe pattern.

That is, the drive control part 482 performs a three-dimensional measurement of the object W using "multi-period phase shift method" using a plurality of pattern lights PL having different periods f of the phase shift methods. In the phase shift method, as the period f of the pattern light PL is longer, the measurement range is wider, but the depth resolution is lower. As the period f of the pattern light PL is shorter, the measurement range is narrower, but the depth resolution is higher. Accordingly, the above described multi-period phase shift method is used, and thereby, a balance between the wider measurement range and the higher depth resolution may be achieved. Note that the multi-period phase shift method is not particularly limited to, but includes e.g. a method of measurements at a plurality of times with respect to each period of the plurality of periods or a method of measurements at a different number of times with respect to each period of the plurality of periods.

In this regard, it is only necessary that the drive control part 482 executes at least the first imaging step S1 and the second imaging step S2. For example, the third, fourth imaging steps S3, S4 may be omitted, or a fifth imaging step S5, a sixth imaging step S6, and more steps may be further provided. As the number of steps is made larger, the measurement range may be made wider and the depth resolution may be made higher, however, the time taken for acquisition of captured images (image data) is greater as the number of times of imaging is larger and operation efficiency of the robot 2 is lower. Accordingly, the number of steps may be appropriately set in consideration of the balance between the accuracy and measurement range of the three-dimensional measurement and the operation efficiency of the robot 2.

At the first imaging step S1, the drive control part 482 projects the first pattern light PL1 on the object W at four times while shifting phase by $\pi/2$, and images the region containing the object W on which the first pattern light PL1 is projected using the camera 471 at each time. Similarly, at the second imaging step S2, the drive control part 482 projects the second pattern light PL2 on the object W at four times while shifting phase by $\pi/2$, and images the region containing the object W on which the second pattern light PL2 is projected using the camera 471 at each time. Similarly, at the third imaging step S3, the drive control part 482 projects the third pattern light PL3 on the object W at four times while shifting phase by $\pi/2$, and images the region containing the object W on which the third pattern light PL3 is projected using the camera 471 at each time. Similarly, at the fourth imaging step S4, the drive control part 482 projects the fourth pattern light PL4 on the object W at four times while shifting phase by $\pi/2$, and images the region containing the object W on which the fourth pattern light PL4 is projected using the camera 471 at each time.

Note that, at the first imaging step S1, the number of times of projection of the first pattern light PL1 with phase shifts is not particularly limited as long as the phase may be calculated from the imaging result at the number of times. As the number of times is made larger, the phase may be calculated with higher accuracy, however, the time taken for acquisition of captured images (image data) is greater as the number of times of imaging by the camera 471 is larger and operation efficiency of the robot 2 is lower. Accordingly, the number of times of projection of the first pattern light PL1 may be appropriately set in consideration of the balance between the accuracy of the three-dimensional measurement and the operation efficiency of the robot 2. The same applies to the second imaging step S2, the third imaging step S3, and the fourth imaging step S4. Note that the numbers of times of projection of the pattern light PL may be the same as one another at the first to fourth imaging steps S1 to S4 or different at least at one step from the other steps.

As above, the phase shift method performed by the drive control part 482 is explained. Next, execution times of the above described first to fourth imaging steps S1 to S4 will be explained in detail. FIG. 6 is a graph showing attenuation of the vibration Q left in the fifth arm 225 (the projection unit 41 and the imaging unit 47) after the fifth arm 225 moves to a posture for three-dimensional measurement of the object W and start times of the first to fourth imaging steps S1 to S4.

As shown in the graph, the drive control part 482 starts the first imaging step S1 when the vibration information, i.e., the magnitude of the vibration Q (the peak value of the amplitude) received from the vibration sensor 7 by the vibration information receiving part 481 is equal to or smaller than a first threshold value L1, starts the second imaging step S2 when the magnitude of the vibration Q received from the vibration sensor 7 by the vibration information receiving part 481 is equal to or smaller than a second threshold value L2 smaller than the first threshold value L1, starts the third imaging step S3 when the magnitude of the vibration Q received from the vibration sensor 7 by the vibration information receiving part 481 is equal to or smaller than a third threshold value L3 smaller than the second threshold value L2, and starts the fourth imaging step S4 when the magnitude of the vibration Q received from the vibration sensor 7 by the vibration information receiving part 481 is equal to or smaller than a fourth threshold value L4 smaller than the third threshold value L3.

Here, as the period f of the pattern light PL is longer, the influence by the vibration Q is less. Accordingly, as described above, the first imaging step S1 using the first pattern light PL1 having the longest period f is started when the vibration Q is larger, as the vibration Q is attenuated, the period f is made shorter with time such as the second imaging step S2 using the second pattern light PL2 having the shorter period f than the pattern light PL1, the third imaging step S3 using the third pattern light PL3 having the shorter period f than the second pattern light PL2, and the fourth imaging step S4 using the fourth pattern light PL4 having the shorter period f than the third pattern light PL3, and thereby, the respective first to fourth imaging steps S1 to S4 may be performed with the suppressed influence by the vibration Q. Therefore, regardless of the magnitude of the vibration Q, the three-dimensional measurement of the object W may be performed with high accuracy. Further, according to the method, the three-dimensional measurement may be started even when the residual vibration Q is relatively large, and thus, the time taken after the robot arm 22 is in the posture for three-dimensional measurement of the object W and before the three-dimensional measurement of the object W is completed may be made shorter. Accordingly, the operation efficiency of the robot 2 is improved.

Note that the first threshold value L1, the second threshold value L2, the third threshold value L3, and the fourth threshold value L4 are respectively not particularly limited, but, for example, may be appropriately set depending on the period f of the pattern light PL for use and the distance between the imaging unit 47 and the optical scanning part 45. Further, the above description "starts the first imaging step S1 when the vibration Q is equal to or smaller than the first threshold value L1" means that starting imaging of the region containing the object W on which the first pattern light PL1 is projected using the camera 471 when the magnitude (peak value) of the vibration Q is equal to or smaller than the first threshold value L1. The influence of the vibration is great at the time of imaging by the camera 471, and, when the magnitude (peak value) of the vibration Q is equal to or smaller than the first threshold value L1 at least at the time of imaging, the above described effect may be exerted. That is, the projection start time of the first pattern light PL1 is not particularly limited, but, for example, projection may be started when the magnitude of the vibration Q is larger than the first threshold value L1 or the projection may be started when the magnitude is equal to or smaller than the first threshold value L1. Note that the former is preferable because the time taken for the three-dimensional measurement may be made shorter. The same applies to the description "starts the second imaging step S2 when the vibration Q is equal to or smaller than the second threshold value L2", "starts the third imaging step S3 when the vibration Q is equal to or smaller than the third threshold value L3", and "starts the fourth imaging step S4 when the vibration Q is equal to or smaller than the fourth threshold value L4".

Depending on the time taken for imaging, the attenuation speed of the vibration Q, or the like, the magnitude (peak value) of the vibration Q may be equal to or smaller than the second the threshold value L2 before the first imaging step S1 is completed. That is, the time when the start of the second imaging step S2 is allowed may come before the first imaging step S1 is completed. In this case, the second imaging step S2 may be started after the first imaging step S1 is completed. The same applies to the third, fourth imaging steps S3, S4.

The measuring unit 49 performs the three-dimensional measurement of the object W based on the plurality of captured images (image data) acquired by the imaging unit 47 at the first to fourth imaging steps S1 to S4 using the phase shift method. Specifically, the unit calculates three-dimensional information including the posture, position (spatial coordinates), etc. of the object W. Then, the measuring unit 49 transmits the calculated three-dimensional information of the object W to the host computer 6.

Host Computer

The host computer 6 generates a position command of the robot 2 from the three-dimensional information of the object W calculated by the measuring unit 49, and transmits the generated position command to the robot control apparatus 5. The robot control apparatus 5 respectively independently drives the first to sixth drive devices 251 to 256 based on the position command received from the host computer 6, and moves the first to sixth arms 221 to 226 to the instructed positions. Note that, in the embodiment, the host computer 6 and the measuring unit 49 are separately provided, however, the function of the measuring unit 49 may be mounted on the host computer 6.

As above, the robot system 1 is explained. The three-dimensional measuring apparatus 4 contained in the robot system 1 is the apparatus that performs the three-dimensional measurement of the object W using the laser beam L, and, as described above, includes the projection unit 41 that projects the pattern lights PL by the laser beam L on the region containing the object W, the imaging unit 47 that images the captured image of the region containing the object W, the vibration information receiving part 481 that receives the vibration information on the vibration of the projection unit 41 or the imaging unit 47 (both in the embodiment) (magnitude of the vibration Q), and the measuring unit 49 that measures the three-dimensional shape of the object W based on the captured image acquired by the imaging unit 47. Further, the three-dimensional measuring apparatus 4 is configured to image the region containing the object W on which the first pattern light PL1 having the first period f1 is projected using the imaging unit 47 when the vibration information received by the vibration information receiving part 481 is equal to or smaller than the first threshold value L1, and image the region containing the object W on which the second pattern light PL2 having the second period f2 shorter than the first period f1 is projected using the imaging unit 47 when the vibration information received by the vibration information receiving part 481 is equal to or smaller than the second threshold value L2 smaller than the first threshold value L1. According to the configuration, as described above, the influence by the vibration Q may be suppressed, and the three-dimensional measurement of the object W may be performed with high accuracy. Further, the three-dimensional measurement may be started even when the residual vibration Q is relatively large, and thus, the time taken after the robot arm 22 is in the posture for three-dimensional measurement of the object W and before the three-dimensional measurement of the object W is completed may be made shorter. Accordingly, the operation efficiency of the robot 2 is improved.

As described above, the three-dimensional measuring apparatus 4 contains the vibration sensor 7. That is, the three-dimensional measuring apparatus 4 has the vibration sensor 7 that acquires the vibration information on the vibration of the projection unit 41 or the imaging unit 47. Thereby, the vibration information on the vibration of the projection unit 41 or the imaging unit 47 may be acquired with high accuracy. Accordingly, the above described three-dimensional measurement of the object W may be performed with higher accuracy.

As described above, the robot 2 includes the projection unit 41 placed in the robot arm 22 and projecting the pattern light PL by the laser beam L on the region containing the object W, the imaging unit 47 placed in the robot arm 22 and imaging the captured image of the region containing the object W on which the pattern light PL is projected, the vibration information receiving part 481 that receives the vibration information on the vibration of the projection unit 41 or the imaging unit 47 (both in the embodiment), and the measuring unit 49 that measures the three-dimensional shape of the object W based on the captured image. Further, the robot 2 is configured to image the region containing the object W on which the first pattern light PL1 having the first period f1 is projected using the imaging unit 47 when the vibration information received by the vibration information receiving part 481 is equal to or smaller than the first threshold value L1, and image the region containing the object W on which the second pattern light PL2 having the second period f2 shorter than the first period f1 is projected using the imaging unit 47 when the vibration information received by the vibration information receiving part 481 is equal to or smaller than the second threshold value L2 smaller than the first threshold value L1. According to the configuration, as described above, the influence by the vibration Q may be suppressed, and the three-dimensional measurement of the object W may be performed with high accuracy. Further, the three-dimensional measurement may be started even when the residual vibration Q is relatively large, and thus, the time taken after the robot arm 22 is in the posture for three-dimensional measurement of the object W and before the three-dimensional measurement of the object W is completed may be made shorter.

As described above, the robot system 1 includes the robot 2 having the robot arm 22, the three-dimensional measuring apparatus 4 that performs the three-dimensional measurement of the object W using the laser beam L, and the robot control apparatus 5 that controls the operation of the robot 2 based on the measurement result by the three-dimensional measuring apparatus 4. Further, the three-dimensional measuring apparatus 4 includes the projection unit 41 that projects the pattern light PL by the laser beam L on the region containing the object W, the imaging unit 47 that images the captured image of the region containing the object W on which the pattern light PL is projected, the vibration information receiving part 481 that receives the vibration information on the vibration of the projection unit 41 or the imaging unit 47, and the measuring unit 49 that measures the three-dimensional shape of the object W based on the captured image. Further, the apparatus is configured to image the region containing the object W on which the first pattern light PL1 having the first period f1 is projected using the imaging unit 47 when the vibration information received by the vibration information receiving part 481 is equal to or smaller than the first threshold value L1, and image the region containing the object W on which the second pattern light PL2 having the second period f2 shorter than the first period f1 is projected using the imaging unit 47 when the vibration information received by the vibration information receiving part 481 is equal to or smaller than the second threshold value L2 smaller than the first threshold value L1. According to the configuration, as described above, the influence by the vibration Q may be suppressed, and the three-dimensional measurement of the object W may be performed with high accuracy. Further, the three-dimensional measurement may be started even when the residual vibration Q is relatively large, and thus, the time taken after the robot arm 22 is in the posture for three-dimensional measurement of the object W and before the three-dimensional measurement of the object W is completed may be made shorter.

The three-dimensional measuring apparatus 4 is the apparatus that performs the three-dimensional measurement of the object W using the laser beam L, and, as described above, includes the drive control part 482 including the processor, the projection unit 41 that projects the pattern light PL by the laser beam L on the region containing the object W, the imaging unit 47 that images the captured image of the region containing the object W on which the pattern light PL is projected, the vibration information receiving part 481 that receives the vibration information on the vibration of the projection unit 41 or the imaging unit 47, and the measuring unit 49 that measures the three-dimensional shape of the object W based on the captured image. Further, the drive control part 482 is configured to image the region containing the object W on which the first pattern light PL1 having the first period f1 is projected using the imaging unit 47 when the vibration information received by the vibration information receiving part 481 is equal to or smaller than the first threshold value L1, and image the region containing the object W on which the second pattern light PL2 having the second period f2 shorter than the first period f1 is projected using the imaging unit 47 when the vibration information received by the vibration information receiving part 481 is equal to or smaller than the second threshold value L2 smaller than the first threshold value L1. According to the configuration, as described above, the influence by the vibration Q may be suppressed, and the three-dimensional measurement of the object W may be performed with high accuracy. Further, the three-dimensional measurement may be started even when the residual vibration Q is relatively large, and thus, the time taken after the robot arm 22 is in the posture for three-dimensional measurement of the object W and before the three-dimensional measurement of the object W is completed may be made shorter.

Second Embodiment

Figure 7:
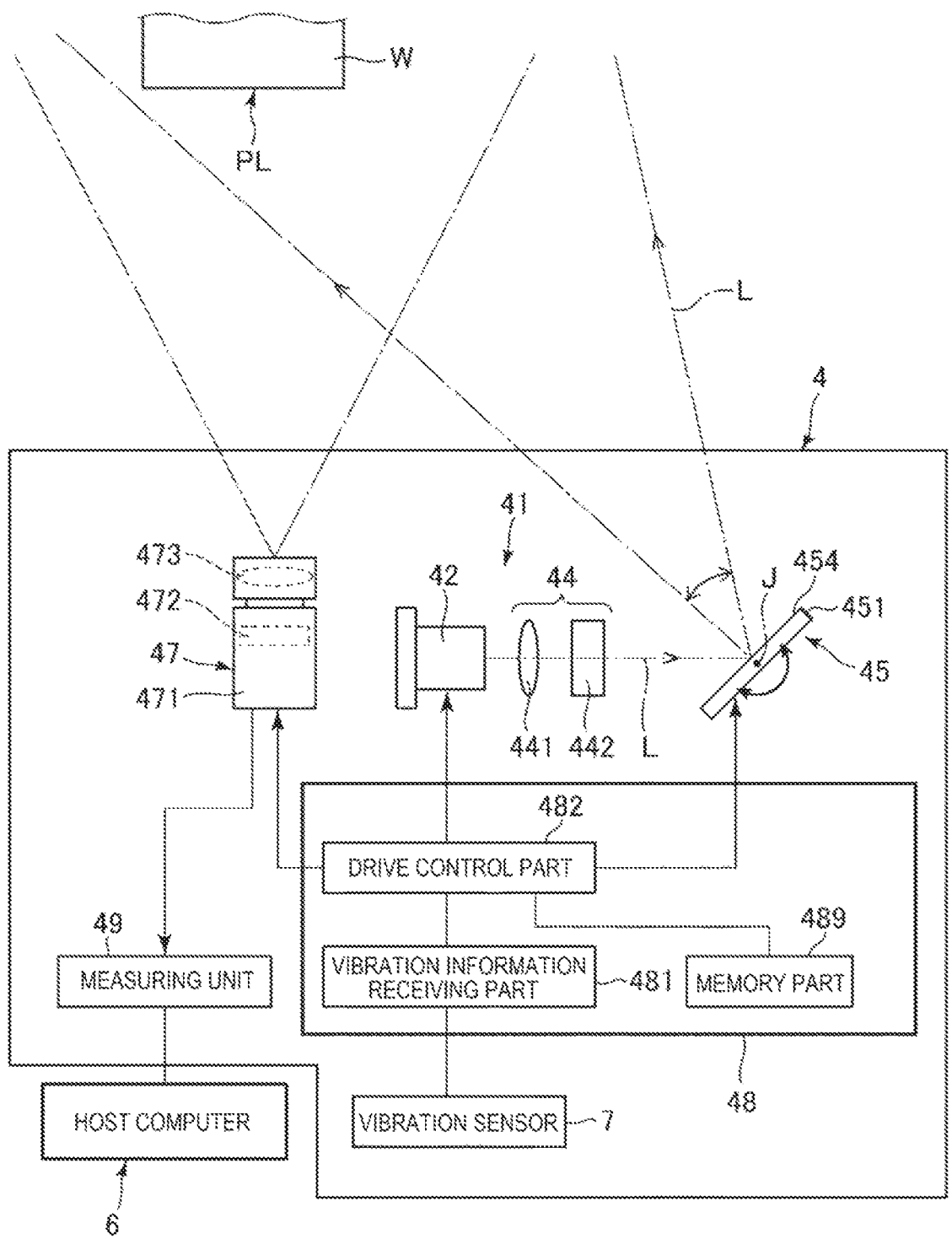
FIG. 7 shows an overall configuration of a three-dimensional measuring apparatus of a robot system according to a second embodiment of the present disclosure.

FIG. 7 shows the overall configuration of the three-dimensional measuring apparatus of the robot system according to the second embodiment of the present disclosure.

In the following description, the robot system 1 of the second embodiment will be explained with a focus on the differences from the above described embodiment, and the explanation of the same items will be omitted. The robot system 1 of the second embodiment is substantially the same as the robot system 1 of the above described first embodiment except that the control method of the control unit 48 for the three-dimensional measurement of the object W is different. Note that, in FIG. 7, the same configurations as those of the above described embodiment have the same signs.

As shown in FIG. 7, the control unit 48 has a memory part 489 including a flash memory or the like. In the memory part 489, as shown in FIG. 6, a first time T1 when the magnitude of the vibration Q (peak value) is the first threshold value L1, a second time T2 when the magnitude of the vibration Q is the second threshold value L2, a third time T3 when the magnitude of the vibration Q is the third threshold value L3, and a fourth time T4 when the magnitude of the vibration Q is the fourth threshold value L4 are stored. Here, the first time T1 is a time after the robot arm 22 is in the posture for three-dimensional measurement of the object W and before the magnitude of the vibration Q is the first threshold value L1. In the above description, the time when the robot arm 22 is in the posture for three-dimensional measurement of the object W is used as a reference, however, the reference time is not particularly limited. This applies to the second to fourth times T2 to T4.

In the configuration, the drive control part 482 performs the first imaging step S1 at or after the first time T1, performs the second imaging step S2 at or after the second time T2, performs the third imaging step S3 at or after the third time T3, and performs the fourth imaging step S4 at or after the fourth time T4. As described above, the first to fourth times T1 to T4 are store in the memory part 489 in advance, the first to fourth imaging steps S1 to S4 are performed based on the stored first to fourth times T1 to T4, and thereby, the control in the drive control part 482 may be simpler.

Here, the first to fourth times T1 to T4 are stored at teaching. That is, when the robot 2 is moved in the same manner as that in the work at automatic movement, the first to fourth times T1 to T4 are obtained from the magnitude of the vibrator Q received by the vibration information receiving part 481, and thus obtained first to fourth times T1 to T4 are stored in the memory part 489. Thereby, more precise first to fourth times T1 to T4 are stored, and the three-dimensional measurement of the object W may be performed with higher accuracy and the time taken for the three-dimensional measurement may be made shorter.

Note that, for example, the drive control part 482 sequentially performs the first to fourth imaging steps S1 to S4 based on the relationships between the magnitude of the vibration Q and the first to fourth threshold values L1 to L4 as is the case of the above described first embodiment at the nth (n is a natural number) work by the robot 2, and concurrently, the first to fourth times T1 to T4 at the nth work are stored in the memory part 489. Then, at the (n+1)th work, the drive control part 482 may sequentially perform the first to fourth imaging steps S1 to S4 based on the first to fourth times T1 to T4 obtained at the nth work immediately before. According to the configuration, prior teaching of the first to fourth times T1 to T4 is not necessary. The first to fourth times T1 to T4 are obtained in the last work, and thereby, the first to fourth times T1 to T4 may be more precise.

Note that the first to fourth times T1 to T4 obtained at the nth work may be used not at the (n+1)th work, but at any time of work of the (n+1)th and subsequent works. Specifically, for example, the first to fourth times T1 to T4 may be updated for each work such that the first to fourth times T1 to T4 obtained at the nth work are used only for the (n+1)th work and the first to fourth times T1 to T4 obtained at the (n+1)th work are used only for the (n+2)th work. Or, for example, the first to fourth times T1 to T4 obtained at a certain time of work may be used for a subsequent plurality of times of work such that the first to fourth times T1 to T4 obtained at the nth work are used for the (n+1)th to (n+10)th works and the first to fourth times T1 to T4 obtained at the (n+10)th work are used for the (n+11)th to (n+20)th works.

Or, for example, the first to fourth times T1 to T4 may be obtained by a simulation or the like and the obtained first to fourth times T1 to T4 may be stored in the memory part 489. In this case, the vibration sensor 7 and the vibration information receiving part 481 are unnecessary and the configuration of the robot system 1 may be simplified.

As described above, the three-dimensional measuring apparatus 4 of the embodiment includes the memory part 489 that stores the first time T1 when the vibration information (the magnitude of the vibration Q) is the first threshold value L1 and the second time T2 when the vibration information is the second threshold value L2 after the first time T1. Then, the drive control part 482 images the region containing the object W on which the first pattern light PL1 having the first period f1 is projected using the imaging unit 47 at or after the first time T1 and images the region containing the object W on which the second pattern light PL2 having the second period f2 shorter than the first period f1 is projected using the imaging unit 47 at or after the second time T2. According to the configuration, the control in the drive control part 482 is simpler.

As described above, the first time T1 and the second time T2 are stored at teaching. Thereby, the more precise first to fourth times T1 to T4 are stored, and the three-dimensional measurement of the object W may be performed with higher accuracy and the time taken for the three-dimensional measurement may be made shorter.

Third Embodiment

Figure 8:
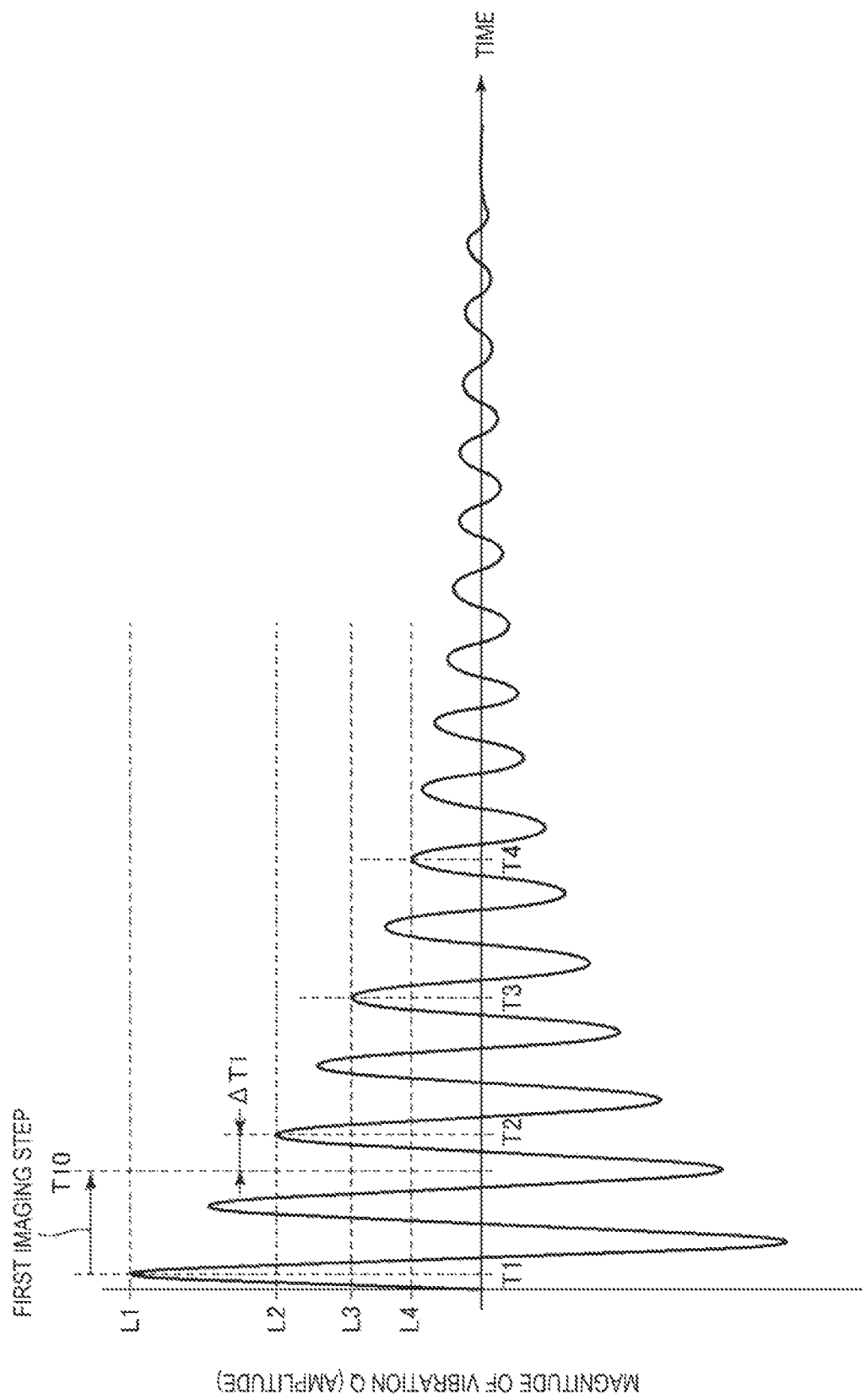
FIG. 8 is a graph showing relationships between magnitude of vibration and start times of the first to fourth imaging steps.
Figure 9:
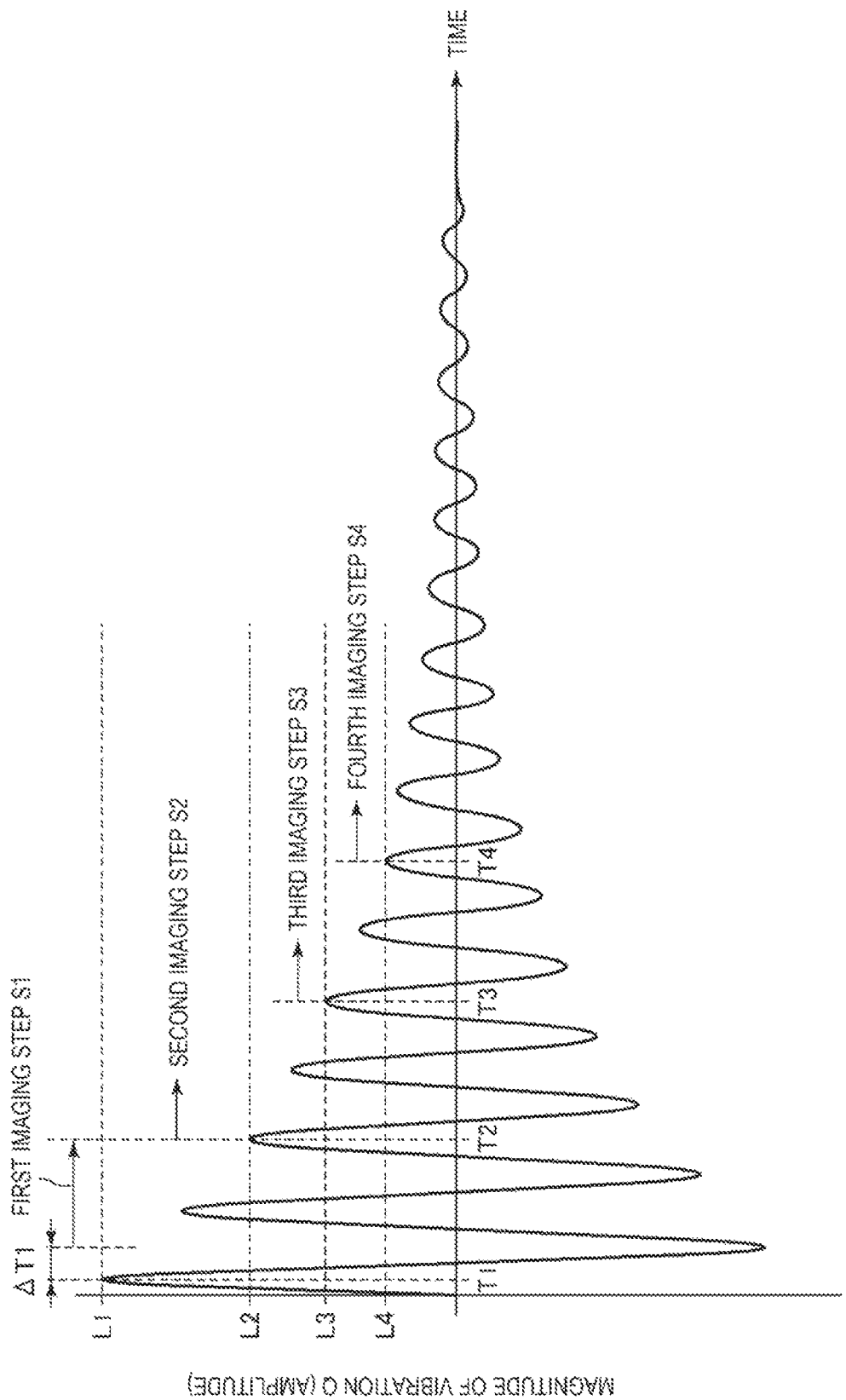
FIG. 9 is a graph showing start times of first to fourth imaging steps in a third embodiment of the present disclosure.
Figure 10:
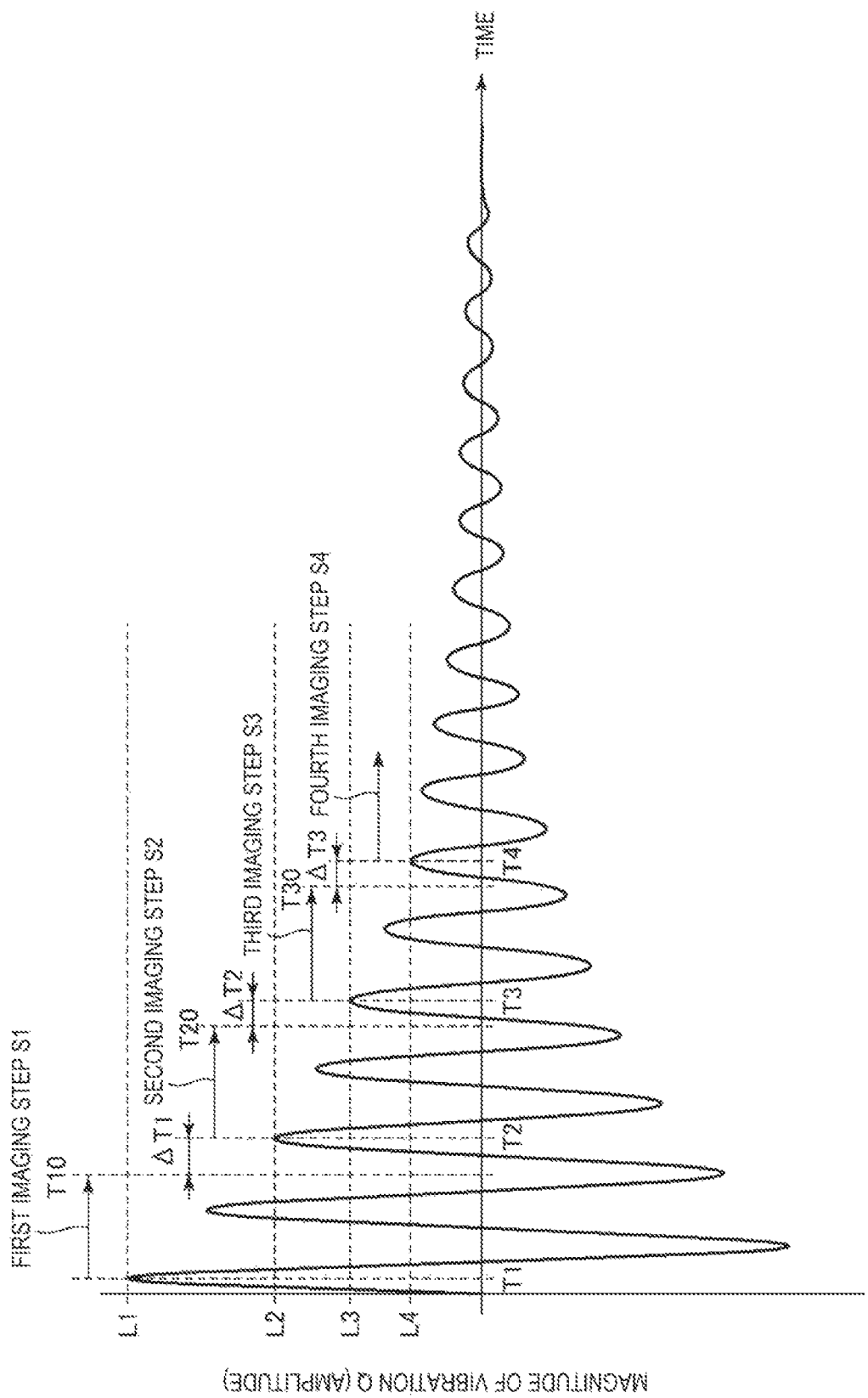
FIG. 10 is a graph showing relationships between magnitude of vibration and the start times of the first to fourth imaging steps.

FIG. 8 is the graph showing relationships between the magnitude of vibration and the start times of the first to fourth imaging steps. FIG. 9 is the graph showing the start times of the first to fourth imaging steps according to the third embodiment of the present disclosure. FIG. 10 is the graph showing relationships between the magnitude of vibration and the start times of the first to fourth imaging steps.

In the following description, the robot system 1 of the third embodiment will be explained with a focus on the differences from the above described embodiments, and the explanation of the same items will be omitted. The robot system 1 of the third embodiment is substantially the same as the robot system 1 of the above described second embodiment except that the control method of the control unit 48 for the three-dimensional measurement of the object W is different. Note that, in FIGS. 8 to 10, the same configurations as those of the above described embodiments respectively have the same signs.

For example, as shown in FIG. 8, it is assumed that the first imaging step S1 is started simultaneously with the first time T1, and a first completion time T10 when the first imaging step S1 is completed is located before the second time T2 when the second imaging step S2 may be started. The first completion time T10 specifically refers to a time when imaging of the region containing the object W on which the first pattern light PL1 is projected using the imaging unit 47 ends, i.e., a time when the fourth imaging ends in the embodiment.

In this case, to smoothly start the second imaging step S2, it is necessary to keep driving the respective component elements of the projection unit 41, particularly, the optical scanning part 45 from the first completion time T10 to the second time T2 and electric power is wastefully consumed. On the other hand, if driving of the optical scanning part 45 is stopped from the first completion time T10 to the second time T2, when the optical scanning part is driven again, it is necessary to wait for stabilization of the amplitude of the movable portion 451 and it may be harder to smoothly start the second imaging step S2. As described above, when the first completion time T10 is located before the second time T2, some problem may occur.

Accordingly, in the embodiment, the drive control part 482 stores a time difference between the first completion time T10 and the second time T2 as a time $\Delta T1$ in the memory part 489 and, as shown in FIG. 9, performs the first imaging step S1 after a lapse of the time $\Delta T1$ from the first time T1. Thereby, the first imaging step S1 and the second imaging step S2 may be continuously performed substantially without any temporal interval. Therefore, the above described problem may be solved. Further, the time to start the first imaging step S1 is delayed from the first time T1 by the time $\Delta T1$, and attenuation of the vibration Q progresses by the time delay and the first imaging step S1 is harder to be affected by the vibration Q. Note that the time $\Delta T1$ may be stored in the memory part 489 by teaching, simulation, or the like in advance, or the time $\Delta T1$ obtained at the nth work of the robot 2 may be stored and used for the (n+1)th and subsequent works.

As shown in FIG. 10, further, when a second completion time T20 when the second imaging step S2 is completed is located before the third time T3 when the third imaging step S3 may be started and a third completion time T30 when the third imaging step S3 is completed is located before the fourth time T4 when the fourth imaging step S4 may be started, the drive control part 482 stores a time difference between the second completion time T20 and the third time T3 as a time $\Delta T2$ in the memory part 489 and stores a time difference between the third completion time T30 and the fourth time T4 as a time $\Delta T3$ in the memory part 489, and performs the first imaging step S1 after a lapse of the sum of the times $\Delta T1$, $\Delta T2$, $\Delta T3$ from the first time T1. Thereby, the first to fourth imaging steps S1 to S4 may be continuously performed substantially without any temporal interval.

As described above, in the three-dimensional measuring apparatus 4 of the embodiment, the memory part 489 stores a time from the time when imaging of the region containing the object W on which the first pattern light PL1 having the first period f1 is projected using the imaging unit 47 ends (first completion time T10) to the second time T2 as the time ΔT1, and the drive control part 482 also delays the time to image the region containing the object W on which the first pattern light PL1 having the first period f1 is projected using the imaging unit 47, i.e., the start time of the first imaging step S1 from the first time T1 by the time ΔT1. Thereby, the first imaging step S1 and the second imaging step S2 may be continuously performed substantially without any temporal interval. Accordingly, power saving drive may be performed and the second imaging step S2 may be smoothly started. Further, the time to start the first imaging step S1 is delayed from the first time T1 by the time ΔT1, and attenuation of the vibration Q progresses by the time delay and the first imaging step S1 is harder to be affected by the vibration Q.

Fourth Embodiment

Figure 11:
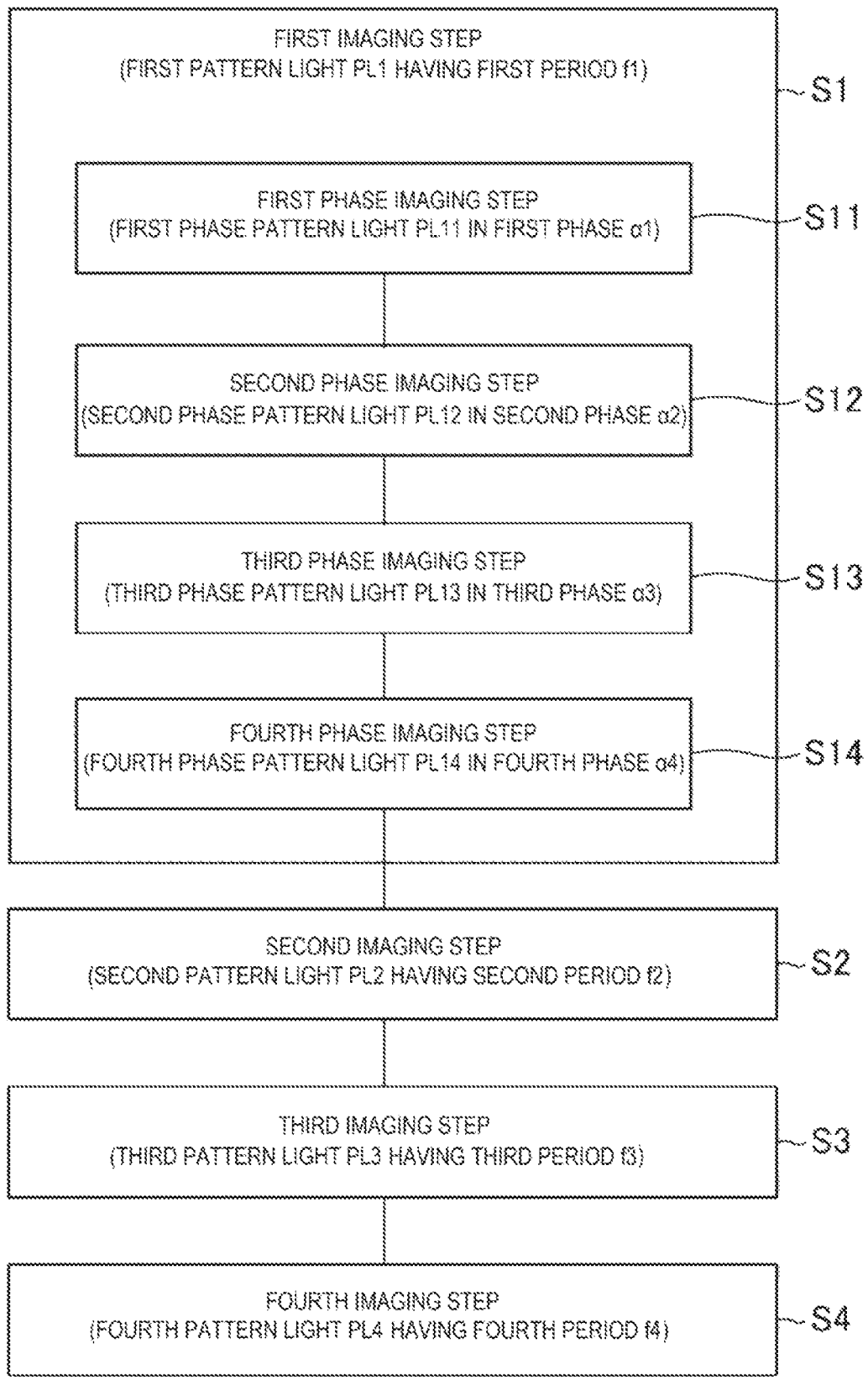
FIG. 11 is a flowchart showing a procedure of a three-dimensional measurement using the phase shift method in a fourth embodiment of the present disclosure.
Figure 12:
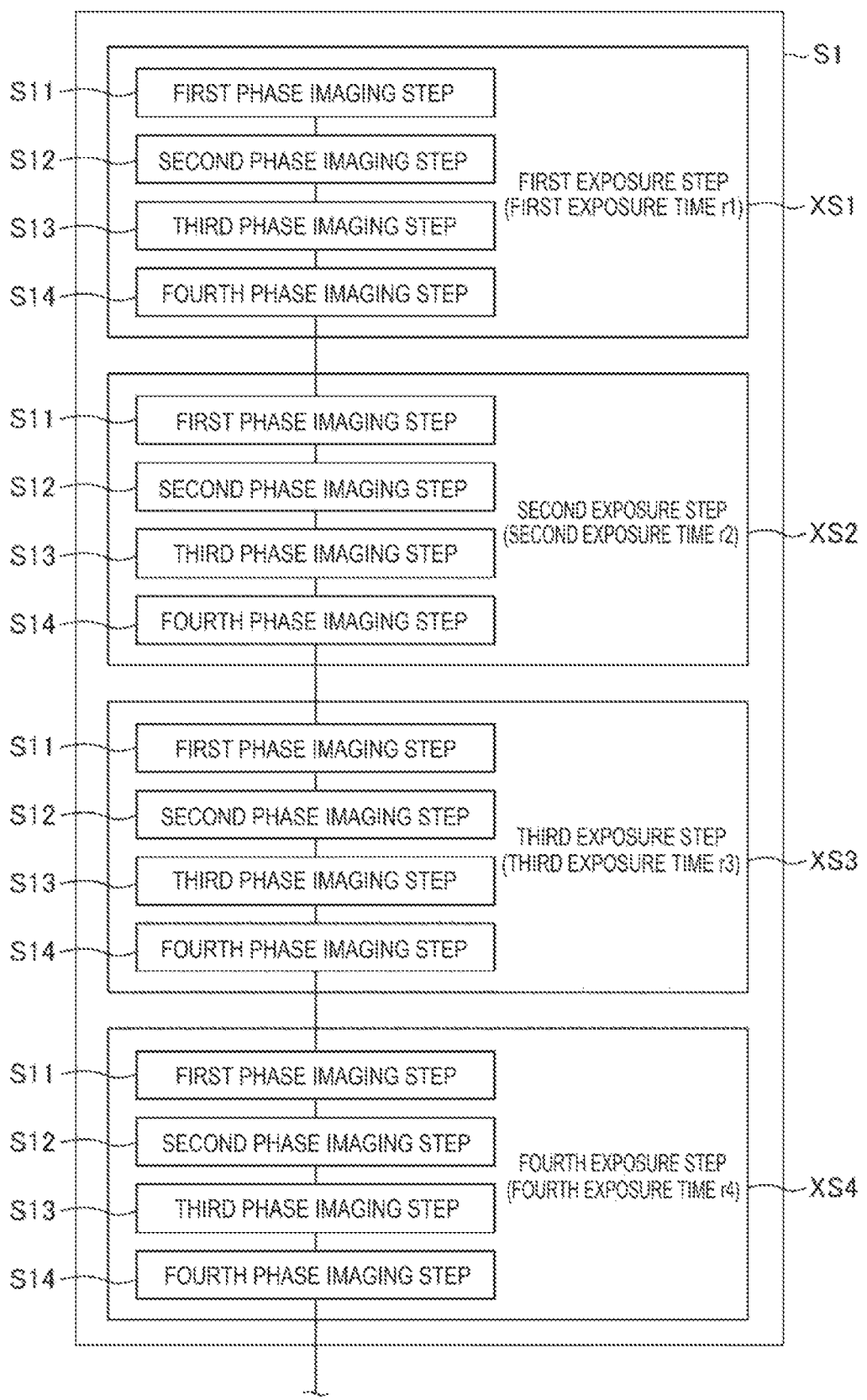
FIG. 12 is a flowchart showing a procedure of the three-dimensional measurement using the phase shift method in the fourth embodiment of the present disclosure.

FIGS. 11 and 12 are respectively flowcharts showing the procedure of the three-dimensional measurement using the phase shift method in the fourth embodiment of the present disclosure.

In the following description, the robot system 1 of the fourth embodiment will be explained with a focus on the differences from the above described embodiments, and the explanation of the same items will be omitted. The robot system 1 of the fourth embodiment is substantially the same as the robot system 1 of the above described first embodiment except that HDR (High Dynamic Range) imaging is performed for three-dimensional measurement of the object W. Note that, in FIGS. 11 and 12, respectively, the same configurations as those of the above described embodiment have the same signs.

In the robot system 1 of the embodiment, an HDR synthesis technology is used for three-dimensional measurement of the object W. The HDR synthesis refers to a technology of generating an image having less "blown out highlights" and "blocked up shadows" and a wider dynamic range by imaging the region containing the object W using the imaging unit 47 at a plurality of times while changing exposure and synthesizing those captured images. The HDR synthesis technology is used, and thereby, sharper images may be obtained and the three-dimensional measurement of the object W may be performed with high accuracy because of the sharpness.

As is the case of the above described embodiments, at the first imaging step S1, the drive control part 482 projects the first pattern light PL1 on the object W at four times while shifting phase by π/2, and images the region containing the object W on which the first pattern light PL1 is projected using the camera 471 at each time. That is, as shown in FIG. 11, the first imaging step S1 has a first phase imaging step S11 of imaging the region containing the object W on which a first phase pattern light PL11 having a first phase α1 is projected using the camera 471. The first imaging step S1 has a second phase imaging step S12 of imaging the region containing the object W on which a second phase pattern light PL12 having a second phase α2 shifted by π/2 from the first phase α1 is projected using the camera 471. The first imaging step S1 has a third phase imaging step S13 of imaging the region containing the object W on which a third phase pattern light PL13 having a third phase α3 shifted by π/2 from the second phase α2 is projected using the camera 471. The first imaging step S1 has a fourth phase imaging step S14 of imaging the region containing the object W on which a fourth phase pattern light PL14 having a fourth phase α4 shifted by π/2 from the third phase α3 is projected using the camera 471.

Further, in the embodiment, for HDR synthesis, the above described first to fourth phase imaging steps S11 to S14 are repeated at four times while changing the exposure of the camera 471. Note that the exposure may be changed by exposure time (shutter speed), aperture, or the like, however, in the embodiment, the aperture is fixed and the exposure is changed by the exposure time. This is because, when the aperture changes, the depth of field changes, and blur or the like is produced and acquisition of homogeneous image data may be harder.

Specifically, as shown in FIG. 12, the drive control part 482 has a first exposure step XS1 of sequentially performing the first to fourth phase imaging steps S11 to S14 with the exposure time of the camera 471 set to a first exposure time r1, a second exposure step XS2 of sequentially performing the first to fourth phase imaging steps S11 to S14 with the exposure time of the camera 471 set to a second exposure time r2 longer than the first exposure time r1, a third exposure step XS3 of sequentially performing the first to fourth phase imaging steps S11 to S14 with the exposure time of the camera 471 set to a third exposure time r3 longer than the second exposure time r2, and a fourth exposure step XS4 of sequentially performing the first to fourth phase imaging steps S11 to S14 with the exposure time of the camera 471 set to a fourth exposure time r4 longer than the third exposure time r3.

Here, as the exposure time of the camera 471 is shorter, that is, the shutter speed is faster, the influence by the vibration Q is less. Accordingly, as described above, when the vibration Q is the maximum, the first exposure step XS1 of imaging with the shortest first exposure time r1 is performed, and, as the vibration Q is attenuated, the exposure time is made longer with time such as the second exposure step XS2 using the second exposure time r2 longer than the first exposure time r1, the third exposure step XS3 using the third exposure time r3 longer than the second exposure time r2, and the fourth exposure step XS4 using the fourth exposure time r4 longer than the third exposure time r3, and thereby, the respective first to fourth exposure steps XS1 to XS4 may be performed with the suppressed influence by the vibration Q. Therefore, the three-dimensional measurement of the object W may be performed with high accuracy. Further, according to the method, the first imaging step S1 may be started even when the residual vibration Q is relatively large, and thus, the time taken after the robot arm 22 is in the posture for three-dimensional measurement of the object W and before the three-dimensional measurement of the object W is completed may be made shorter. Accordingly, the operation efficiency of the robot 2 is improved.

Note that the drive control part 482 may execute at least the first exposure step XS1 and the second exposure step XS2 and, for example, the third, fourth exposure steps XS3, XS4 may be omitted or may further have a fifth exposure step, sixth exposure step, . . . with longer exposure times r. As the number of steps is made larger, sharper images may be obtained, however, the time taken for acquisition of captured images (image data) is greater as the number of times of imaging is larger and operation efficiency of the robot 2 is lower. Accordingly, the number of steps may be appropriately set in consideration of the balance between the accuracy and imaging area of the three-dimensional measurement and the brightness range of the object W and the operation efficiency of the robot 2.

As above, the first imaging step S1 is explained, however, the same applies to the second imaging step S2, the third imaging step S3, and the fourth imaging step S4. Accordingly, the detailed explanation of the second to fourth imaging steps S2 to S4 is omitted.

As described above, in the three-dimensional measuring apparatus 4 of the embodiment, the first pattern light PL1 formed by the imaging unit 41 contains the first phase pattern light PL11 and the second phase pattern light PL12 with the phase shift from the first phase pattern light PL11. Further, the imaging unit 47 images the region containing the object W on which the first phase pattern light PL11 is projected and the region containing the object W on which the second phase pattern light PL12 is projected in the first exposure time r1, and then, images the region containing the object W on which the first phase pattern light PL11 is projected and the region containing the object W on which the second phase pattern light PL12 is projected in the second exposure time r2 longer than the first exposure time r1. According to the configuration, the influence by the vibration Q may be sufficiently suppressed and the three-dimensional measurement of the object W may be performed with high accuracy. Further, the three-dimensional measurement of the object W may be started even when the residual vibration Q is relatively large, and the operation efficiency of the robot 2 is improved.

As above, the three-dimensional measuring apparatus, control apparatus, and robot system according to the present disclosure are explained based on the illustrated drawings, however, the present disclosure is not limited to those. The configurations of the respective parts may be replaced by arbitrary configurations having the same functions. Further, other arbitrary configurations may be added to the present disclosure.

For example, when a dual-arm robot having two robot arms 22 is used as the robot 2, the projection unit 41 may be placed in the fifth arm 225 of one robot arm 22 and the imaging unit 47 may be placed in the fifth arm 225 of the other robot arm 22. In this case, the relative position relationship between the projection unit 41 and the imaging unit 47 changes depending on the motion of the respective robot arms 22, however, the relative position relationship is calculated from the postures of the robot arms 22, and thereby, the three-dimensional measurement of the object W by the phase shift method can be performed. Further, in this case, the vibration sensor 7 may be placed in one robot arm 22, the vibration sensor 7 may detect the vibration of one of the projection unit 41 and the imaging unit 47, and the vibration information receiving part 481 may receive the vibration, or the vibration sensors 7 may be placed in the respective robot arms 22, the two vibration sensors 7 may detect the vibrations of both the projection unit 41 and the imaging unit 47, and the vibration information receiving part 481 may receive the vibrations. In the latter case, the drive control part 482 may perform the above described control based on e.g. the larger vibration Q. Or, the part may perform the above described control based on an average value of the vibrations.

What is claimed is:

1. A three-dimensional measuring apparatus comprising:
   a processor;
   a projection unit that projects a first pattern light and a second pattern light by a laser beam on a region containing an object;
   an imaging unit that images a captured image of the region;
   a vibration information receiving part that receives vibration information on a vibration of the projection unit or the imaging unit; and
   a measuring unit that measures a three-dimensional shape of the object based on the captured image, wherein
   the processor controls the imaging unit to image the region on which the first pattern light having a first period is projected when the vibration information is equal to or smaller than a first threshold value, and controls the imaging unit to image the region on which the second pattern light having a second period shorter than the first period is projected when the vibration information is equal to or smaller than a second threshold value smaller than the first threshold value.

2. The three-dimensional measuring apparatus according to claim 1, further comprising
   a memory part that stores a first time when the vibration information is the first threshold value and a second time when the vibration information is the second threshold value after the first time, wherein
   the processor controls the imaging unit to image a region containing the object on which the first pattern light is projected at or after the first time, and controls the imaging unit to image a region containing the object on which the second pattern light is projected at or after the second time.

3. The three-dimensional measuring apparatus according to claim 2, wherein
   the first time and the second time are stored in the memory part at teaching.

4. The three-dimensional measuring apparatus according to claim 2, wherein
   the memory part stores a time from when imaging of the region containing the object on which the first pattern light is projected ends to the second time, and
   the processor delays a time when the imaging unit images the region on which the first pattern light is projected from the first time by that time.

5. The three-dimensional measuring apparatus according to claim 1, further comprising a vibration sensor that acquires the vibration information and transmits the vibration information to the vibration information receiving part.

6. The three-dimensional measuring apparatus according to claim 2, further comprising a vibration sensor that acquires the vibration information and transmits the vibration information to the vibration information receiving part.

7. The three-dimensional measuring apparatus according to claim 3, further comprising a vibration sensor that acquires the vibration information and transmits the vibration information to the vibration information receiving part.

8. The three-dimensional measuring apparatus according to claim 4, further comprising a vibration sensor that acquires the vibration information and transmits the vibration information to the vibration information receiving part.

9. The three-dimensional measuring apparatus according to claim 1, wherein
   the first pattern light contains a first phase pattern light and a second phase pattern light with a phase shift from the first phase pattern light, and
   the processor controls the imaging unit to image the region on which the first phase pattern light is projected and the region on which the second phase pattern light is projected in a first exposure time, and then, controls the imaging unit to image the region on which the first phase pattern light is projected and the region on which the second phase pattern light is projected in a second exposure time longer than the first exposure time.

10. The three-dimensional measuring apparatus according to claim 2, wherein
the first pattern light contains a first phase pattern light and a second phase pattern light with a phase shift from the first phase pattern light, and
the processor controls the imaging unit to image the region on which the first phase pattern light is projected and the region on which the second phase pattern light is projected in a first exposure time, and then, controls the imaging unit to image the region on which the first phase pattern light is projected and the region on which the second phase pattern light is projected in a second exposure time longer than the first exposure time.

11. The three-dimensional measuring apparatus according to claim 3, wherein
the first pattern light contains a first phase pattern light and a second phase pattern light with a phase shift from the first phase pattern light, and
the processor controls the imaging unit to image the region on which the first phase pattern light is projected and the region on which the second phase pattern light is projected in a first exposure time, and then, controls the imaging unit to image the region on which the first phase pattern light is projected and the region on which the second phase pattern light is projected in a second exposure time longer than the first exposure time.

12. The three-dimensional measuring apparatus according to claim 4, wherein
the first pattern light contains a first phase pattern light and a second phase pattern light with a phase shift from the first phase pattern light, and
the processor controls the imaging unit to image the region on which the first phase pattern light is projected and the region on which the second phase pattern light is projected in a first exposure time, and then, controls the imaging unit to image the region on which the first phase pattern light is projected and the region on which the second phase pattern light is projected in a second exposure time longer than the first exposure time.

13. The three-dimensional measuring apparatus according to claim 5, wherein
the first pattern light contains a first phase pattern light and a second phase pattern light with a phase shift from the first phase pattern light, and
the processor controls the imaging unit to image the region on which the first phase pattern light is projected and the region on which the second phase pattern light is projected in a first exposure time, and then, controls the imaging unit to image the region on which the first phase pattern light is projected and the region on which the second phase pattern light is projected in a second exposure time longer than the first exposure time.

14. A robot including a robot arm comprising:
a processor;
a projection unit placed in the robot arm and projecting a first pattern light and a second pattern light by a laser beam on a region containing an object;
an imaging unit placed in the robot arm and imaging a captured image of the region;
a vibration information receiving part that receives vibration information on a vibration of the projection unit or the imaging unit; and
a measuring unit that measures a three-dimensional shape of the object based on the captured image, wherein
the processor controls the imaging unit to image the region on which the first pattern light having a first period is projected when the vibration information is equal to or smaller than a first threshold value, and controls the imaging unit to image the region on which the second pattern light having a second period shorter than the first period is projected when the vibration information is equal to or smaller than a second threshold value smaller than the first threshold value.

15. A robot system comprising:
a robot including a robot arm;
a three-dimensional measuring apparatus that performs a three-dimensional measurement of an object using a laser beam; and
a robot controller that controls an operation of the robot based on a measurement result by the three-dimensional measuring apparatus, wherein
the three-dimensional measuring apparatus includes
a projection unit that projects a first pattern light and a second pattern light by the laser beam on a region containing the object,
an imaging unit that images a captured image of the region,
a vibration information receiving part that receives vibration information on a vibration of the projection unit or the imaging unit, and
a measuring unit that measures a three-dimensional shape of the object based on the captured image, and
the robot controller controls the imaging unit to image the region on which the first pattern light having a first period is projected when the vibration information is equal to or smaller than a first threshold value, and controls the imaging unit to image the region on which the second pattern light having a second period shorter than the first period is projected when the vibration information is equal to or smaller than a second threshold value smaller than the first threshold value.

* * * * *